Dec. 8, 1942.   E. E. EKERT   2,304,246
CHEWING GUM
Filed Dec. 18, 1940
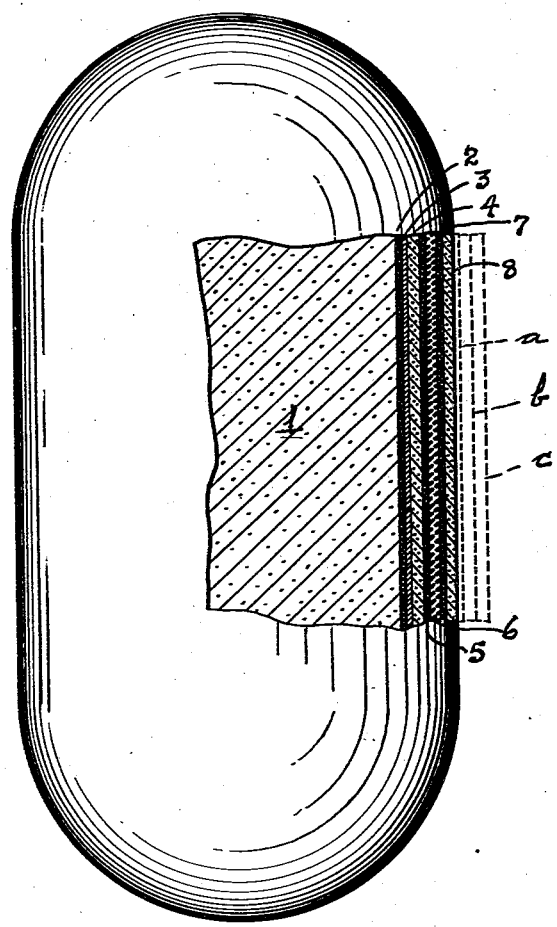
INVENTOR.
Edward E. Ekert
BY
ATTORNEY.

Patented Dec. 8, 1942

2,304,246

UNITED STATES PATENT OFFICE 2,304,246

CHEWING GUM

Edward E. Ekert, Rego Park, N. Y., assignor to American Chicle Co., Long Island City, N. Y., a corporation of New Jersey Application December 18, 1940, Serial No. 370,576

6 Claims. (Cl. 99—135)

The present invention relates to a charcoal-containing chewing gum and particularly a chewing gum unit containing activated charcoal.

It has heretofore been proposed to employ charcoal as an ingredient in chewing gum as, for example, to provide an abrasive ingredient for polishing the teeth. In the patent to Flint, No. 2,138,804, it is proposed to mix activated carbon with the chewing gum base, the patent fixing 4% as the practical upper limit for the amount of activated charcoal or carbon to be thus used, although the patentee indicated in his example that a lesser proportion was desirable in order that the chewing qualities of the gum would not be affected, as by making the gum "short." With such maximum proportion of activated carbon, proposed by the said Flint patent, the amount thereof in one stick of chewing gum is about 1 grain. Such a small amount has been found by me to be ineffective for one of the primary purposes thereof, i. e., the sweetening of the mouth by removing odorous and toxic substances. It is the primary object of the present invention to provide a chewing gum unit in which the proportion of charcoal or activated carbon may be very largely increased, as, for example, to more than double the amount possible in accordance with the said Flint patent, and to employ the activated carbon or charcoal in such manner that it will be unnecessary to employ more than the usual quantity of flavoring material or to employ a combination of very strong flavoring agents, which requirements are present in the product of the Flint patent because of the absorption and retention of a large proportion of the flavoring ingredient or ingredients by the activated carbon.

The invention will be described with reference to the accompanying drawing which shows in enlarged scale and somewhat diagrammatically a chewing gum unit in accordance with the present invention, one side of the unit being broken away.

My procedure is started by the preparation of chewing gum centers of any suitable constituents. Those types of gum mix customarily employed, and with or without a charcoal ingredient, may be used for the gum center, indicated in the drawing at 1.

The second step is to coat the gum centers with a thin coating of adhesive which may for example be a mixture of invert and sucrose sugar or the adhesive may be a gum in a suitable solvent, for example, gum arabic, gum senegal, gum tragacanth, and these gums may be used with a sugar solution.

The function of this first adhesive coating is to receive and hold the flavoring; this flavoring, oil of mint being one of many examples, is then applied to the adhesive coating in any suitable manner, as by applying the flavoring to the adhesive-coated units in the course of their tumbling within a tumbling drum of a spheroid shape. In some cases a tacky or adhesive powder may be used for said first coating in substitution of an adhesive liquid.

In the drawing, the initial adhesive coating of the gum center is indicated at 2 and the flavoring held thereby is indicated at 3.

The next step is to seal in the flavoring layer by means of a hard sealing layer indicated in the drawing at 4. This sealing layer is preferably hard sugar. For example, dry sugar may be applied sufficient in quantity to dry the flavoring layer followed by the building-up of a thicker covering of sugar forming a hard shell as by applying the sugar ingredient in syrup form whilst tumbling the units and removing the water constituent by evaporation.

The succeeding step is to apply an adhesive coating to the sugar-sealing layer 4, this adhesive coating being indicated at 5 in the drawing.

Activated charcoal in powder form may then be applied to the adhesive layer 5 until the proportion of charcoal reaches the desired degree as, for example, 1.9 grains or more, although the proportion of charcoal is within the control of the operator and may be more or less, as desired. In the drawing the charcoal layer is indicated at 6.

In completing the unit a coating of adhesive 7 is applied to the charcoal layer and the entire unit is encased with a layer of hard sugar as indicated at 8 in the drawing, and such outer protective layer may be formed in the manner described with respect to the sealing layer 4 for the flavoring.

If desired, an additional charcoal layer may be added. For example, the hard sugar layer 8 may receive a coating $a$ of suitable adhesive material which may be of the type heretofore specified or an oil such as mineral oil. The adhesive coating may then receive charcoal as, for example, activated charcoal in powder form, as by dusting the charcoal powder upon the tumbling units in such proportion that each unit will receive a predetermined thickness of coating and weight, although the coating of charcoal may be applied in any other commercially operative manner, the layer of charcoal being indicated at b in the drawing. The units will then be finally encased with a hard sugar layer or other suitable protective soluble coating c.

By means of the invention, one or more layers of charcoal are held upon the gum center by one or more soluble layers, with the result that the charcoal is readily released in the chewing of the gum unit and may be in such amount as to perform the desired function. The flavoring being positioned with definite relation to the charcoal and there being a soluble separating layer between the two, absorption and retention of flavoring material by the charcoal is prevented. Furthermore, the arrangement of alternate layers of sugar and charcoal enables the use of the latter with a pleasant effect and without any apparent difference in taste from a unit in which the charcoal is mixed with the gum base itself.

In the annexed claims, by "charcoal" I include all forms thereof, including activated carbon.

Having described my invention, what I claim and desire to secure by Letters Patent, is as follows:

1. A chewing gum unit comprising a chewing gum center and a plurality of soluble and substantially insoluble layers thereon, a substantially insoluble layer comprising charcoal, certain of the soluble layers being disposed intermediate the gum center and the subtsantially insoluble layer and intermediate the latter and the exposed face of the unit.

2. A chewing gum unit comprising a chewing gum center and a plurality of soluble and substantially insoluble layers thereon, a substantially insoluble layer comprising charcoal, certain soluble layers comprising hard sugar, a further soluble layer comprising flavoring material, the hard sugar layers being disposed intermediate the gum center and the substantially insoluble layer and intermediate the latter and both the flavoring layer and the exposed face of the unit.

3. A chewing gum unit comprising a chewing gum center and a plurality of soluble and substantially insoluble layers thereon and including substantially insoluble layers comprising charcoal, each substantially insoluble layer being separated from the gum center and from a second substantially insoluble layer by certain of said insoluble layers, and a hard sugar coating encasing the unit.

4. A chewing gum unit comprising a chewing gum center having a coating of adhesive, a layer of flavoring material held by said adhesive, a soluble layer containing sugar surrounding the flavoring material, a layer of charcoal surrounding the said soluble layer and a hard soluble layer containing sugar surrounding the charcoal layer.

5. A chewing gum unit comprising a chewing gum center, a coating of flavoring material on said center, a hard sugar layer surrounding said flavoring coating, a layer of charcoal surrounding the hard sugar layer, and a second hard sugar layer surrounding the charcoal layer.

6. A chewing gum unit comprising a chewing gum center and a plurality of soluble and insoluble layers thereon, a substantially insoluble layer comprising charcoal, and the soluble layers including at least one layer of flavoring characteristics, the substantially insoluble layer and the soluble flavoring layer being separated from each other and from the exterior of the unit by soluble layers providing sealing shells.

EDWARD E. EKERT.